(12) United States Patent
Ensworth et al.

(10) Patent No.: US 12,423,546 B1
(45) Date of Patent: Sep. 23, 2025

(54) CONTROLLING RFID TAG POPULATION BACKSCATTER CHARACTERISTICS

(71) Applicant: Impinj, Inc., Seattle, WA (US)

(72) Inventors: Joshua F. Ensworth, Bothell, WA (US); Alberto Pesavento, Seattle, WA (US); Harley K. Heinrich, Snohomish, WA (US); Theron Stanford, Seattle, WA (US); Thomas G. Anderl, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 18/490,788

(22) Filed: Oct. 20, 2023

Related U.S. Application Data

(63) Continuation of application No. 16/868,561, filed on May 7, 2020, now Pat. No. 11,797,813.

(60) Provisional application No. 62/844,438, filed on May 7, 2019.

(51) Int. Cl.
*G06K 19/07* (2006.01)
*G06K 7/00* (2006.01)
*G06K 7/10* (2006.01)

(52) U.S. Cl.
CPC ....... *G06K 19/0723* (2013.01); *G06K 7/0008* (2013.01); *G06K 7/10297* (2013.01)

(58) Field of Classification Search
CPC ............. G06K 19/0723; G06K 7/0008; G06K 7/10297
See application file for complete search history.

(56) References Cited

U.S. PATENT DOCUMENTS

| | | | |
|---|---|---|---|
| 2002/0024421 A1* | 2/2002 | Kang | G06K 7/10039 340/10.2 |
| 2005/0058292 A1 | 3/2005 | Diorio et al. | |
| 2008/0180221 A1 | 7/2008 | Tuttle | |
| 2018/0247091 A1* | 8/2018 | Nikitin | G06K 7/10019 |

OTHER PUBLICATIONS

Office Action received for U.S. Appl. No. 16/868,561, mailed Apr. 21, 2022, pp. 7.
Office Action received for U.S. Appl. No. 16/868,561, mailed Apr. 6, 2023, pp. 8.
Office Action received for U.S. Appl. No. 16/868,561, mailed Oct. 25, 2022, pp. 7.
Office Action received for U.S. Appl. No. 16/868,561, mailed Sep. 29, 2021, pp. 7.

* cited by examiner

*Primary Examiner* — Matthew Mikels
(74) *Attorney, Agent, or Firm* — Turk IP Law, LLC

(57) ABSTRACT

RFID tag ICs in a population can adjust the impedance values used to backscatter-modulate reply signals to increase the distribution or spread of backscattered signal parameters, thereby facilitating the recovery of collided tag replies. An RFID tag IC may adjust its impedance value(s) based on a reader command or independently.

20 Claims, 7 Drawing Sheets

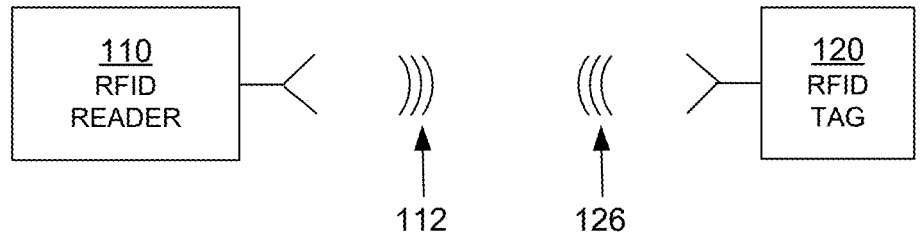
FIG. 1
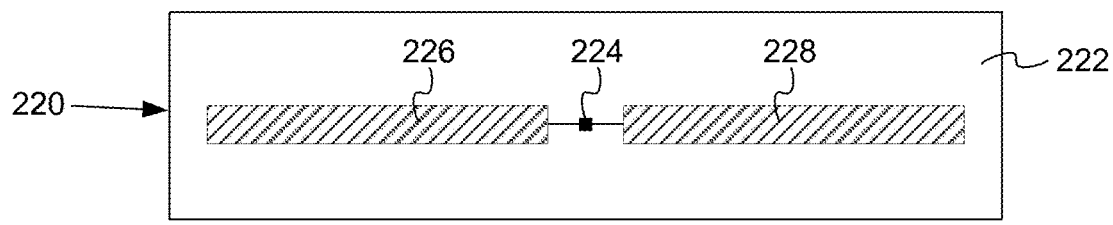
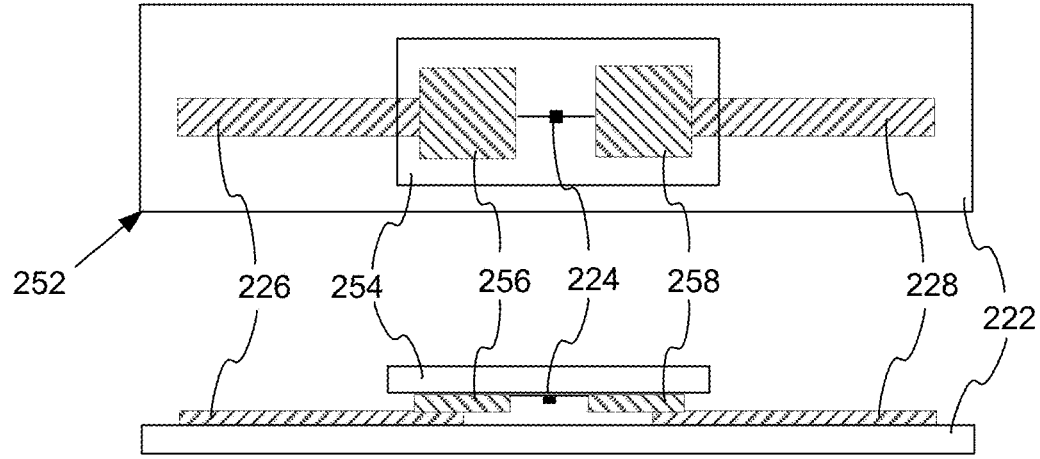
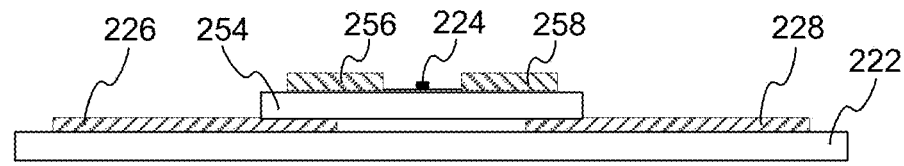
FIG. 2

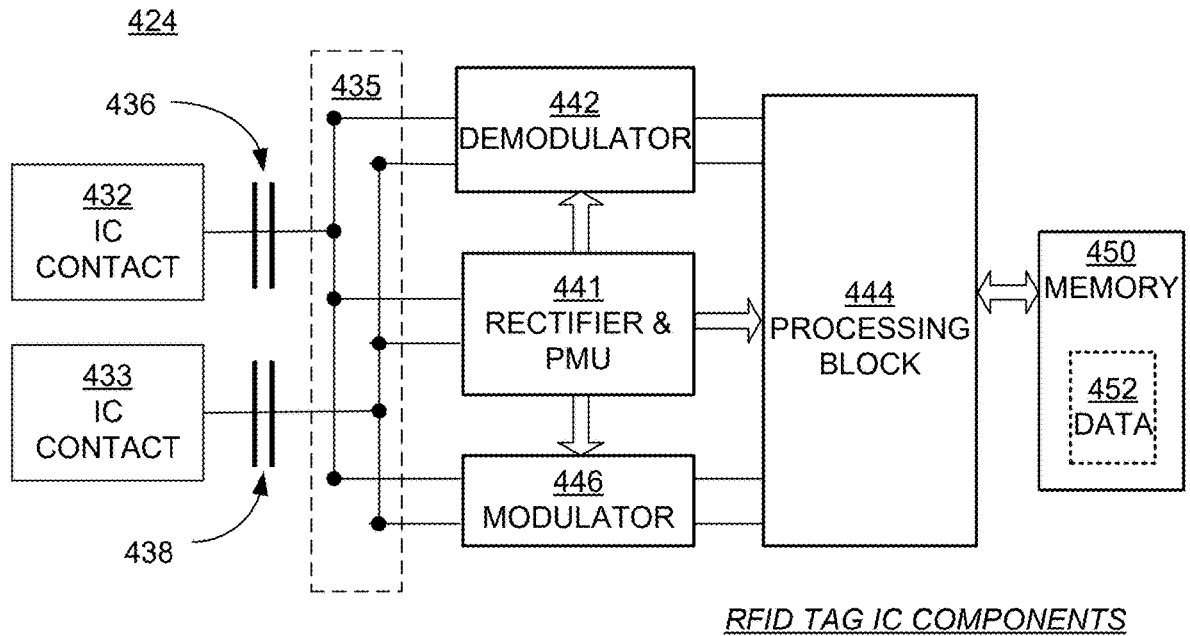
FIG. 4
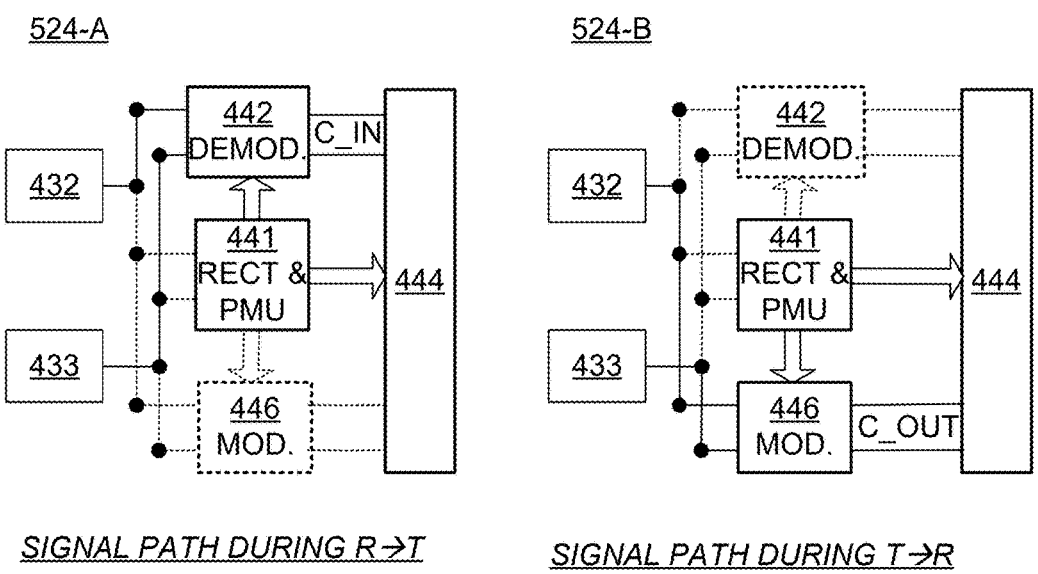
FIG. 5A  FIG. 5B

700

TIME

| 720 STRONG TAG | 730 WEAK TAG | 710 READER |

712 QUERY

722 RN16_S    732 RN16_W

714 RECEIVE COLLIDED REPLY WAVEFORM WITH RN16_S AND RN16_W

716 RECOVER RN16_S FROM REPLY WAVEFORM

718 ACKNOWLEDGE WITH RN16_S

FIG. 7

CONTROLLING RFID TAG POPULATION BACKSCATTER CHARACTERISTICS

CROSS REFERENCE TO RELATED APPLICATIONS

This application is a continuation of U.S. application Ser. No. 16/868,561, filed on May 7, 2020, which claims the benefit of U.S. Provisional Patent Application Ser. No. 62/844,438 filed on May 7, 2019. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package. The RFID tag typically includes, or is, a radio-frequency (RF) integrated circuit (IC).

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. An "inventory round" is defined as a reader staging RFID tags for successive inventorying. The reader transmitting a Radio-Frequency (RF) wave performs the inventory. The RF wave is typically electromagnetic, at least in the far field. The RF wave can also be predominantly electric or magnetic in the near or transitional near field. The RF wave may encode one or more commands that instruct the tags to perform one or more actions. The operation of an RFID reader sending commands to an RFID tag is sometimes known as the reader "interrogating" the tag.

In typical RFID systems, an RFID reader transmits a modulated RF inventory signal (a command), receives a tag reply, and transmits an RF acknowledgement signal responsive to the tag reply. A tag that replies to the interrogating RF wave does so by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

RFID tag ICs in a population can adjust the impedance values used to backscatter-modulate reply signals to increase the distribution or spread of backscattered signal strengths, thereby facilitating the recovery of collided tag replies. An RFID tag IC may adjust its impedance value(s) based on a reader command or independently.

According to one example, a Radio Frequency Identification (RFID) reader system configured to improve collided reply recovery in an RFID tag population is provided. The system includes an RFID reader configured to communicate with the tag population and a controller coupled to the RFID reader. The controller is configured to determine that a reply collision recovery rate of the tag population is unsatisfactory, in response determine that at least a subset of tags in the tag population are to adjust their respective amplitude parameters during backscatter to improve the reply collision recovery rate, and cause the RFID reader to transmit a command instructing at least the subset of tags to adjust their respective amplitude parameters.

According to another example, a Radio Frequency Identification (RFID) reader system configured to improve collided reply recovery in an RFID tag population is provided. The system includes an RFID reader configured to communicate with the tag population and a controller coupled to the RFID reader. The controller is configured to determine that a reply collision recovery rate of the tag population is unsatisfactory, in response determine that at least a subset of tags in the tag population are to adjust their respective phase parameters during backscatter to improve the reply collision recovery rate, and cause the RFID reader to transmit a command instructing at least the subset of tags to adjust their respective phase parameters.

According to a further example, a Radio Frequency Identification (RFID) component configured to improve collided reply recovery in an RFID tag population is provided. The component includes an interface configured to couple to an RFID reader module and a controller. The controller is configured to determine that a reply collision recovery rate of the tag population is unsatisfactory, in response determine that at least a subset of tags in the tag population are to adjust their respective backscatter parameters to adjust a reply power distribution of the tag population, and instruct the RFID reader module via the interface to transmit a command causing each tag in at least the subset of tags to adjust a respective backscatter parameter.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIG. 7 is a diagram depicting an example query-acknowledgement interaction between an RFID reader and multiple RFID tags.

DETAILED DESCRIPTION

Figure 3:
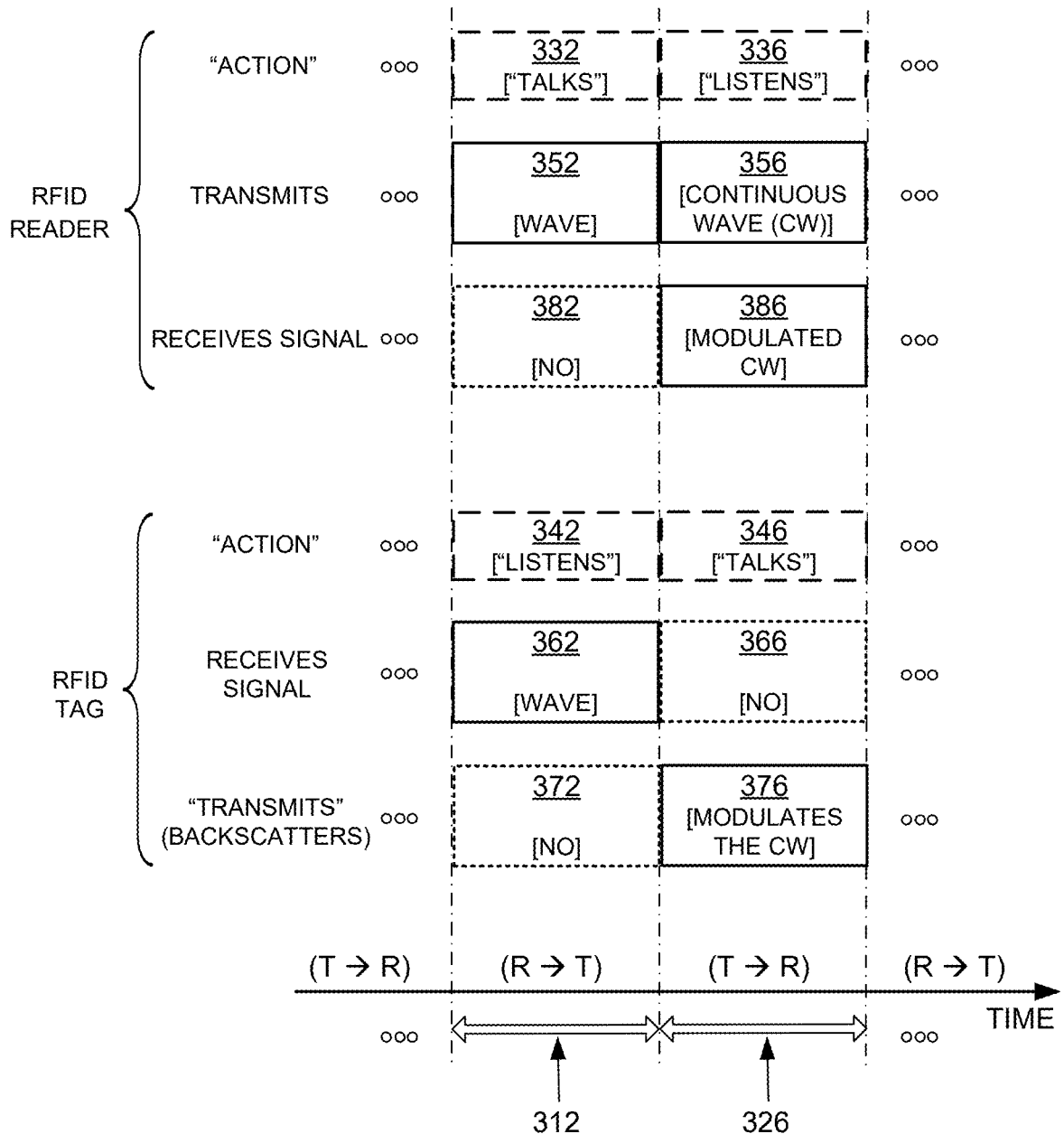
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions, and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Protocol"), versions 1.2.0 and 2.0 of which are hereby incorporated by reference.

In some embodiments, an RFID tag responds to an interrogating RFID reader in a backscatter time interval, by modulating symbols representing data values onto backscattered or reflected portions of a reader-transmitted RF wave during the backscatter time interval. The way in which the RFID tag modulates data symbols onto the backscattered RF wave portions may be defined by one or more protocols. For example, the RFID tag may modulate data symbols onto backscattered RF waves using amplitude-shift keying (ASK) or phase-shift keying (PSK), as described in the Gen2 Protocol. In other embodiments, any other suitable modulation scheme may be used as will be known to one of ordinary skill in the art.

During the backscatter time interval, the RFID tag may modulate data symbols onto a backscattered RF wave by switching an associated impedance between two or more different values in patterns corresponding to the data symbols. For example, the RFID tag may switch a tag front-end impedance presented to an antenna of the RFID tag between a first impedance value and a second impedance value, thereby switching the reflectance of the antenna, to modulate data symbols onto a backscattered RF wave.

Data symbols may be modulated onto a backscattered RF wave as patterns of impedance values and/or transitions between impedance values. For example, a data symbol that corresponds to a binary data value of "0" may be represented by a first series of impedance values and/or impedance value transitions, and a data symbol that corresponds to a binary data value of "1" may be represented by a second series of impedance values and/or impedance value transitions.

The difference or separation between the first impedance value and the second value may be represented by a "delta-gamma" parameter, which may be a ratio of the first impedance value to the second impedance value (or vice-versa). Because the difference between the first impedance value and the second impedance value may be used to represent data values, the magnitude of the difference (or delta-gamma parameter) correlates to the modulation strength (or depth) of the backscattered RF wave as perceived by a receiving reader. For example, a relatively large delta-gamma parameter, corresponding to a relatively large-magnitude difference between the first impedance value and the second impedance value, may result in a backscattered RF signal having a relatively strong modulation. On the other hand, a relatively small delta-gamma parameter, corresponding to a relatively small-magnitude difference between the first impedance value and the second impedance value, may result in a backscattered RF signal having a relatively weak modulation. The modulation strength of a backscattered RF signal may be correlated to the strength or amplitude of the RF signal as perceived by the receiving reader. For example, an RF signal with relatively weak backscatter modulation may appear weaker or lower-amplitude to the reader than an RF signal with relatively strong backscatter modulation.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHz, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is fabricated in complementary metal-oxide semiconductor (CMOS) technology. In other embodiments IC 224 may be fabricated in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. In some embodiments the antenna can be etched, deposited, and/or printed metal on inlay 222; conductive thread formed with or without substrate 222; nonmetallic conductive (such as graphene) patterning on substrate 222; a first antenna coupled inductively, capacitively, or galvanically to a second antenna; or can be fabricated in myriad other ways that exist for forming antennas to receive RF waves. In some embodiments the antenna may even be formed in IC 224. Regardless of the antenna type, IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance or impedance of a shunt-connected or series-connected circuit element which is coupled to the IC contacts. If IC 224 is capable of transmitting signals (e.g., has its own power source, is coupled to an external power source, and/or is can harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, may be partly fabricated before attachment to the item or packaging and then completely fabricated upon attachment to the item or packaging, or the manufacturing process of the item or packaging may include the fabrication of the RFID tag. In some embodiments, the RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. Thus, an "RFID IC" need not be distinct from an item, but more generally refers to the item containing an RFID IC and antenna capable of interacting with RF waves and receiving and responding to RFID signals. Because the boundaries between IC, tag, and item are thus often blurred, the term "RFID IC", "RFID tag IC", or "RFID tag" as used herein may refer to the IC, the tag, or even to the item as long as the referenced element is capable of RFID functionality.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 listens (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal (block 356), which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically-conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a DC short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 424 during either or both reader-to-tag (R→T) and tag-to-reader (TR) intervals. Rectifier and PMU 441 may be implemented in any way known in the art, and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452, and may be at least partly implemented as permanent or semi-permanent memory such as nonvolatile memory (NVM), EEPROM, ROM, or other memory types configured to retain data 452 even when circuit 424 does not have power. Processing block 444 may be configured to read data from and/or write data to memory 450.

Modulator 446 generates a modulated signal from the output signal generated by processing block 444. For example, processing block 444 may cause modulator 446 to modulate data symbols onto a backscattered RF wave, as described above. In one embodiment, modulator 446 generates the modulated signal by driving the load presented by antenna segment(s) coupled to IC contacts 432/433 to form a backscatter signal as described above. In another embodiment, modulator 446 includes and/or uses a transmitter to generate and transmit the modulated signal via antenna segment(s) coupled to IC contacts 432/433. Modulator 446 may be implemented in any suitable way, for example using a switch, driver, amplifier, and other similar components.

Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Protocol mentioned above. In embodiments where circuit 424 includes multiple demodulators modulators, and/or processing blocks, each may be configured to support different protocols or different sets of protocols. A protocol specifies, in part, symbol encodings, and may include a set of modulations, rates, timings, or any other parameter associated with data communications. A protocol can be a variant of an internationally ratified protocol such as the Gen2 Protocol, for example including fewer or additional commands than the ratified protocol calls for, and so on. In some instances, additional commands may sometimes be called custom commands.

Figure 6:
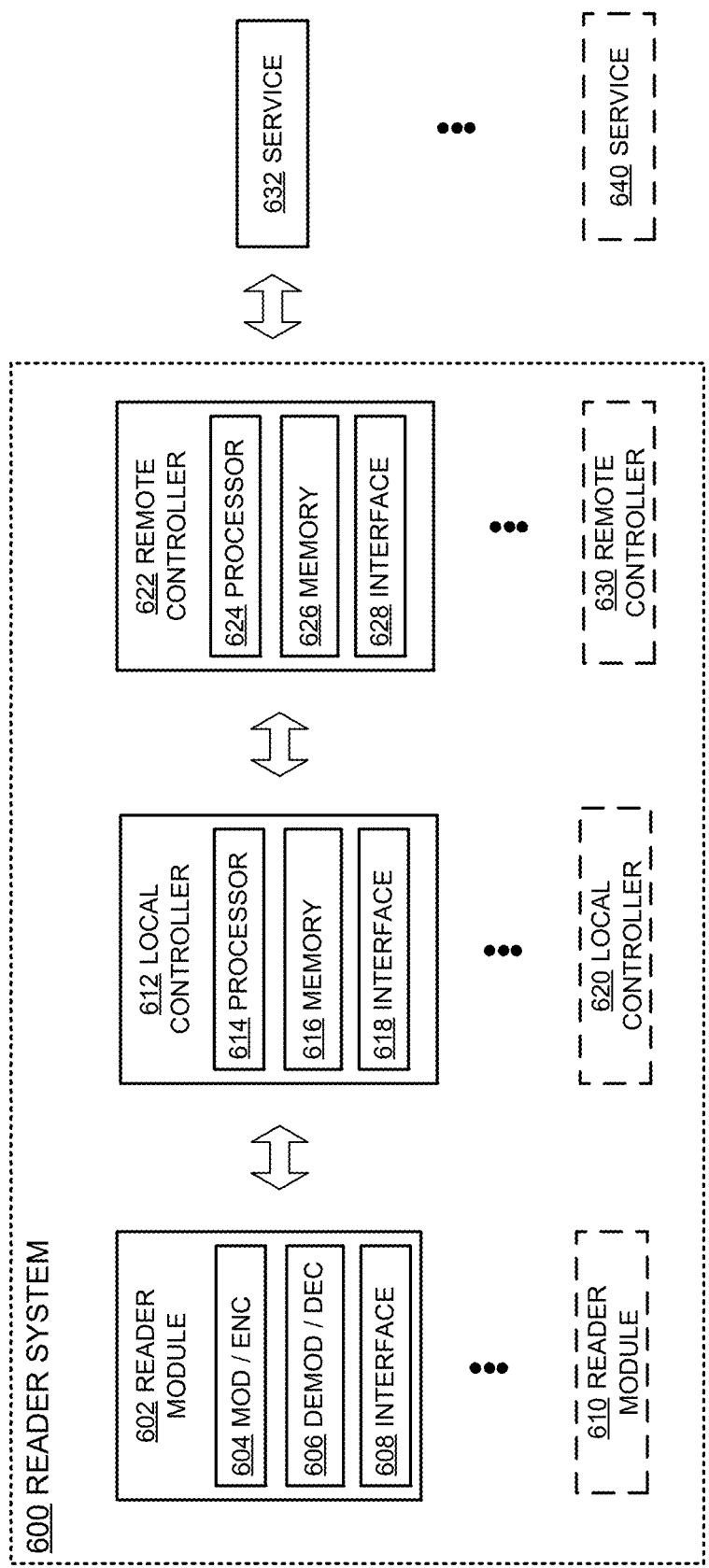
FIG. 6 is a block diagram depicting an RFID reader system according to embodiments.

FIG. 6 is a block diagram depicting an RFID reader system 600 according to embodiments. Reader system 600 is configured to communicate with RFID tags and optionally to communicate with entities external to reader system 600, such as a service 632. Reader system 600 includes at least one reader module 602, configured to transmit signals to and receive signals from RFID tags. Reader system 600 further includes at least one local controller 612, and in some embodiments includes at least one remote controller 622. Controllers 612 and/or 622 are configured to control the operation of reader module 602, process data received from RFID tags communicating through reader module 602, communicate with external entities such as service 632, and otherwise control the operation of reader system 600.

In some embodiments, reader system 600 may include multiple reader modules, local controllers, and/or remote controllers. For example, reader system 600 may include at least one other reader module 610, at least one other local controller 620, and/or at least one other remote controller 630. A single reader module may communicate with multiple local and/or remote controllers, a single local controller may communicate with multiple reader modules and/or remote controllers, and a single remote controller may communicate with multiple reader modules and/or local controllers. Similarly, reader system 600 may be configured to communicate with multiple external entities, such as other reader systems (not depicted) and multiple services (for example, services 632 and 640).

Reader module 602 includes a modulator/encoder block 604, a demodulator/decoder block 606, and an interface block 608. Modulator/encoder block 604 may encode and modulate data for transmission to RFID tags. Demodulator/decoder block 606 may demodulate and decode signals received from RFID tags to recover data sent from the tags. The modulation, encoding, demodulation, and decoding may be performed according to a protocol or specification, such as the Gen2 Protocol. Reader module 602 may use interface block 608 to communicate with local controller 612 and/or remote controller 622, for example to exchange tag data, receive instructions or commands, or to exchange other relevant information.

Reader module 602 and blocks 604/606 are coupled to one or more antennas and/or antenna drivers (not depicted), for transmitting and receiving RF signals. In some embodiments, reader module 602 is coupled to multiple antennas and/or antenna drivers. In these embodiments, reader module 602 may transmit and/or receive RF signals on the different antennas in any suitable scheme. For example, reader module 602 may switch between different antennas to transmit and receive RF signals, transmit on one antenna but receive on another antenna, or transmit and/or receive on multiple antennas simultaneously. In some embodiments, reader module 602 may be coupled to one or more phased-array or synthesized-beam antennas whose beams can be generated and/or steered, for example by reader module 602, local controller 612, and/or remote controller 622.

Modulator/encoder block 604 and/or demodulator/decoder block 606 may be configured to perform conversion between analog and digital signals. For example, modulator/encoder block 604 may convert a digital signal received via interface block 608 to an analog signal for subsequent transmission, and demodulator/decoder block 606 may convert a received analog signal to a digital signal for transmission via interface block 608.

Local controller 612 includes a processor block 612, a memory 616, and an interface 618. Remote controller 622 includes a processor block 622, a memory 626, and an interface 628. Local controller 612 differs from remote controller 622 in that local controller 612 is collocated or at least physically near reader module 602, whereas remote controller 622 is not physically near reader module 602. For example, local Processor blocks 612 and/or 622 may be configured to, alone or in combination, provide different functions. Such functions may include the control of other components, such as memory, interface blocks, reader modules, and similar; communication with other components such as reader module 620, other reader systems, services 632/640, and similar; data-processing or algorithmic processing such as encryption, decryption, authentication, and similar; or any other suitable function. In some embodiments, processor blocks 612/622 may be configured to convert analog signals to digital signals or vice-versa, as described above in relation to blocks 604/606; processor blocks 612/622 may also be configured to perform any suitable analog signal processing or digital signal processing, such as filtering, carrier cancellation, noise determination, and similar.

Processor blocks 612/622 may be configured to provide functions by execution of instructions or applications, which may be retrieved from memory (for example, memory 616 and/or 626) or received from some other entity. Processor blocks 612/622 may be implemented in any suitable way. For example, processor blocks 612/622 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 616/626 are configured to store information, and may be implemented in any suitable way, such as the memory types described above, any combination thereof, or any other known memory or information storage technology. Memories 616/626 may be implemented as part of their associated processor blocks (e.g., processor blocks 614/624) or separately. Memories 616/626 may store instructions, programs, or applications for processor blocks 614/624 to execute. Memories 616/626 may also store other data, such as files, media, component configurations or settings, etc.

In some embodiments, memories 616/626 store tag data. Tag data may be data read from tags, data to be written to tags, and/or data associated with tags or tagged items. Tag data may include identifiers for tags such as electronic product codes (EPCs), tag identifiers (TIDs), or any other information suitable for identifying individual tags. Tag data may also include tag passwords, tag profiles, tag cryptographic keys (secret or public), tag key generation algorithms, and any other suitable information about tags or items associated with tags.

Memories 616/626 may also store information about how reader system 600 is to operate. For example, memories 616/626 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 600 and/or other entities, electronic signatures, and similar.

Interface blocks 608, 618, and 628 are configured to communicate with each other and with other suitably configured interfaces. The communications between interface blocks occur via the exchange of signals containing data, instructions, commands, or any other suitable information. For example, interface block 608 may receive data to be written to tags, information about the operation of reader module 602 and its constituent components, and similar; and may send data read from tags. Interface blocks 618 and 628 may send and receive tag data, information about the operation of other components, other information for enabling local controller 612 and remote controller 622 to operate in conjunction, and similar. Interface blocks 608/618/628 may also communicate with external entities, such as services 632, 640, other services, and/or other reader systems.

Interface blocks 608/618/628 may communicate using any suitable wired or wireless means. For example, interface blocks 608/618/628 may communicate over circuit traces or interconnects, or other physical wires or cables, and/or using any suitable wireless signal propagation technique. In some embodiments, interface blocks 608/618/628 may communicate via an electronic communications network, such as a local area network (LAN), a metropolitan area network (MAN), a wide area network (WAN), a network of networks such as the internet. Communications from interface blocks 608/618/628 may be secured, for example via encryption and other electronic means, or may be unsecured.

Reader system 600 may be implemented in any suitable way. One or more of the components in reader system 600 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 602 and at least one local controller such as local controller 612. Such a reader may or may not include any remote controllers such as remote controller 622. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 622, if not included in a reader, may be implemented separately. For example, remote controller 622 may be implemented as a local host, a remote server, or a database, coupled to one or more readers via one or more communications networks. In some embodiments, remote controller 622 may be implemented as an application executing on a cloud or at a datacenter.

Functionality within reader system 600 may be distributed in any suitable way. For example, the encoding and/or decoding functionalities of blocks 604 and 606 may be performed by processor blocks 614 and/or 624. In some embodiments, processor blocks 614 and 624 may cooperate to execute an application or perform some functionality. One of local controller 612 and remote controller 622 may not implement memory, with the other controller providing memory.

Reader system 600 may communicate with at least one service 632. Service 632 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 632 may be separate from reader system 600, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 614/624. In some embodiments, at least some of the reader or reader system functions and features can be provided as a service, for example, via service 632 or service 640.

RFID techniques may entail using an RFID reader to inventory one or more tags by successively singulating individual tags and receiving backscattered identifiers from the singulated tags. RFID systems typically schedule or queue tag backscatter using anticollision algorithms to avoid multiple tags backscattering at the same time (known as a "collision"). These anticollision algorithms may include slotted-Aloha, random timeslotting, and other scheduling algorithms known to those skilled in the art.

Despite the use of anticollision algorithms, in many cases tag reply collisions will still occur. In these situations, an appropriately configured RFID reader may be able to recover one or more of the collided tag replies. FIG. 7 is a diagram 700 depicting an example query-acknowledgement interaction between an RFID reader and multiple RFID tags. Diagram 700 depicts interactions between RFID reader 710, a strong RFID tag 720, and a weak RFID tag 730 as a function of time (as indicated by the downward arrow on the left, where later events occur below earlier events). A tag's strength from a receiving reader's perspective may be based on the amplitude of the modulation of a reply from the tag as perceived by the reader. For example, two tags that are at different distances from a reader but are otherwise similar may appear to have different strengths, with the closer tag appearing stronger than the farther tag. As another example, two tags that have different delta-gamma parameters (described above) but are otherwise similar, including with respect to reader distance, may appear to have different strengths, with the tag having the larger delta-gamma parameter appearing stronger than the tag having the lower delta-gamma parameter.

Reader 710 may begin at step 712 by transmitting a query command requesting an identifier from tags that match certain criteria. In some embodiments, the query command may be a Query, QueryAdj, or QueryRep command as described in the Gen2 Protocol, and a Gen2-compliant tag having a slot counter value of zero may respond with a 16-bit random number RN16.

In the diagram 700, both the strong tag 720 and the weak tag 730 meet the certain criteria (for example, each may have slot counter values of zero). Accordingly, after detecting the query command both tags backscatter a respective RN16, with strong tag 720 backscattering a strong RN16_S reply signal or waveform at step 722 and weak tag 730 backscattering a weak RN16_W reply signal or waveform at step 732. The tags 720 and 730 may backscatter their respective RN16 reply signals at substantially the same time, resulting in a reply collision. The collided reply waveform may include a complete superposition of the two RN16 reply signals or may include a partial superposition of the two RN16 reply signals. In the latter situation, where some time delay is present from the beginning of one RN16 reply signal and another RN16 reply signal in the collided reply waveform, the time delay may cause the overall length of the collided reply waveform to be longer than the length of an uncollided reply waveform.

At step 714, reader 710 receives a collided reply waveform that is at least a partial superposition of the strong RN16_S reply signal and the weak RN16_W reply signal. In some embodiments, reader 710 is configured to filter noise from an incoming reply waveform in order to correctly recover the information encoded in that reply waveform. Accordingly, at step 716 the reader processes the collided reply waveform received in step 714 as a combination of the strong RN16_S reply signal and noise, which may include both the weak RN16_W reply signal and environmental/RF noise, and may apply digital signal processing techniques, e.g. matched filtering, noise cancellation, equalization, etc., to recover only the strong RN16_S reply signal. Subsequently, at step 718 reader 710 acknowledges the strong tag 720 using, for example, an ACK command according to the Gen2 Protocol. In some embodiments, reader 710 transmits a NAK command to strong tag 720 instead of an ACK command, for example in order to ensure that strong tag 720 remains responsive in the same or subsequent inventory rounds. Reader 710 may also attempt to recover the weak RN16_W reply signal, for example as described in commonly-assigned U.S. Pat. No. 10,037,444 issued on Jul. 31, 2008, hereby incorporated by reference in its entirety for all purposes.

Figure 8:
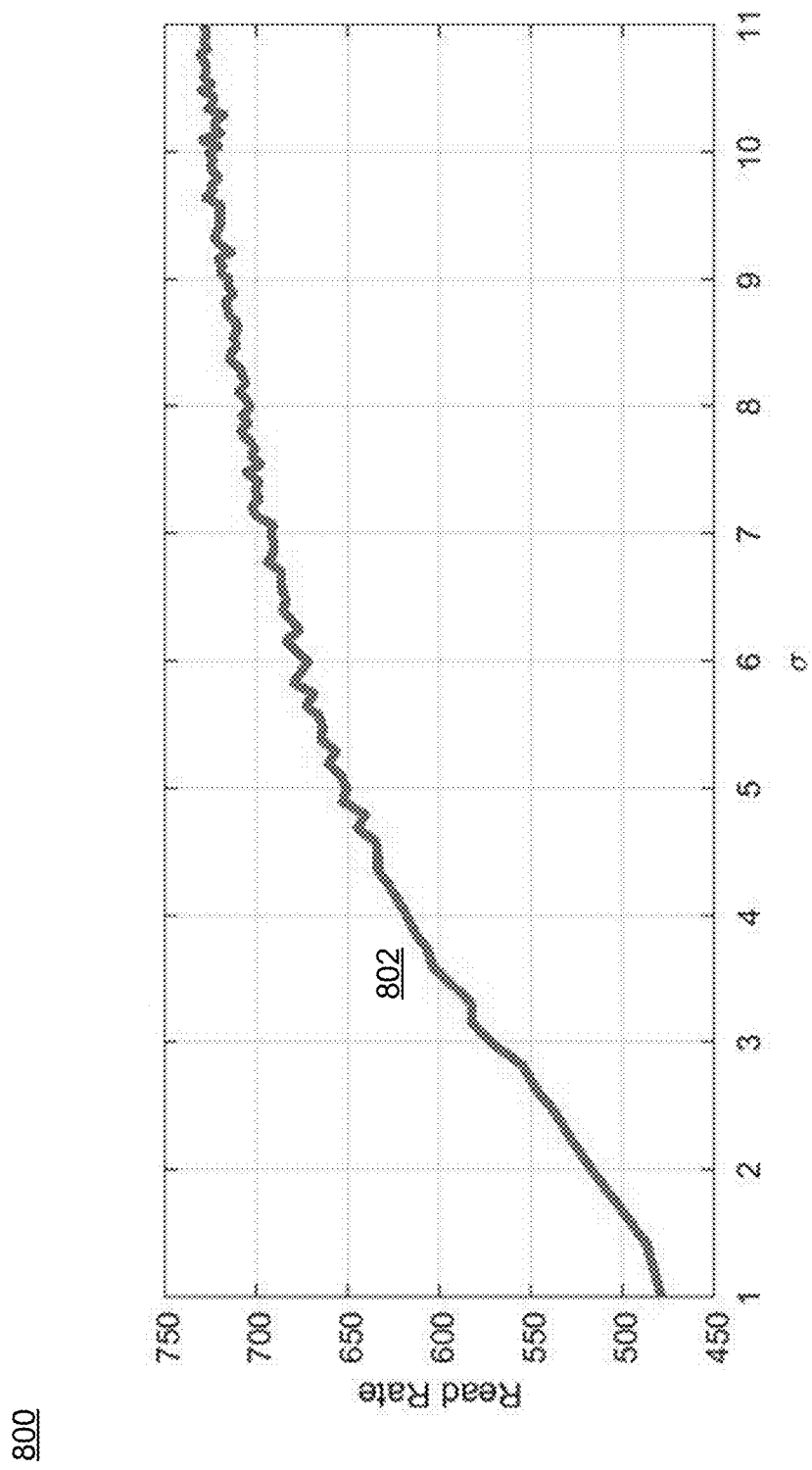
FIG. 8 depicts a chart of tag read rates as a function of the distribution of tag backscatter strengths, according to embodiments.

The probability of successful recovery of a reply from a collision as described above may be based on the backscatter strength difference between the replies in the collision. The larger the backscatter strength difference between collided replies, the more likely that the stronger reply will be successfully recovered. FIG. 8 depicts a chart 800 of tag read rates versus tag backscatter strength (or reply power) distribution for an RFID reader that can recover replies from collisions, according to embodiments. The vertical axis of chart 800 represents tag read rate, while the horizontal axis of chart 800 represents the standard deviation in the tag reply power (analogous to tag backscatter strengths) distribution within a population. As shown by characteristic 802, as the variation of tag reply powers (represented by the standard deviation) in the tag reply power distribution increases, tag read rate also increases. The increase in tag backscatter strength distribution represented by the increased standard deviation in the tag reply power distribution may increase the average strength or amplitude difference between two (or more) replies in a collision. The RFID reader can then more easily recover at least one tag reply (generally the stronger) from the collision, leading to increased reply recovery from collisions in general and a commensurately higher tag read rate.

An RFID system may increase the likelihood that at least one tag reply can be recovered from a collision by causing tags to vary their backscatter strengths so as to increase the reply power distribution of the tag population. As described above, tag backscatter strength is based on, among other things, the tag's distance from a reader and the tag's delta-gamma parameter. In general, a tag cannot alter its distance from the reader. However, a tag can change its delta-gamma parameter by adjusting one or both of the front-end impedance values that together define the delta-gamma parameter.

Figure 9:
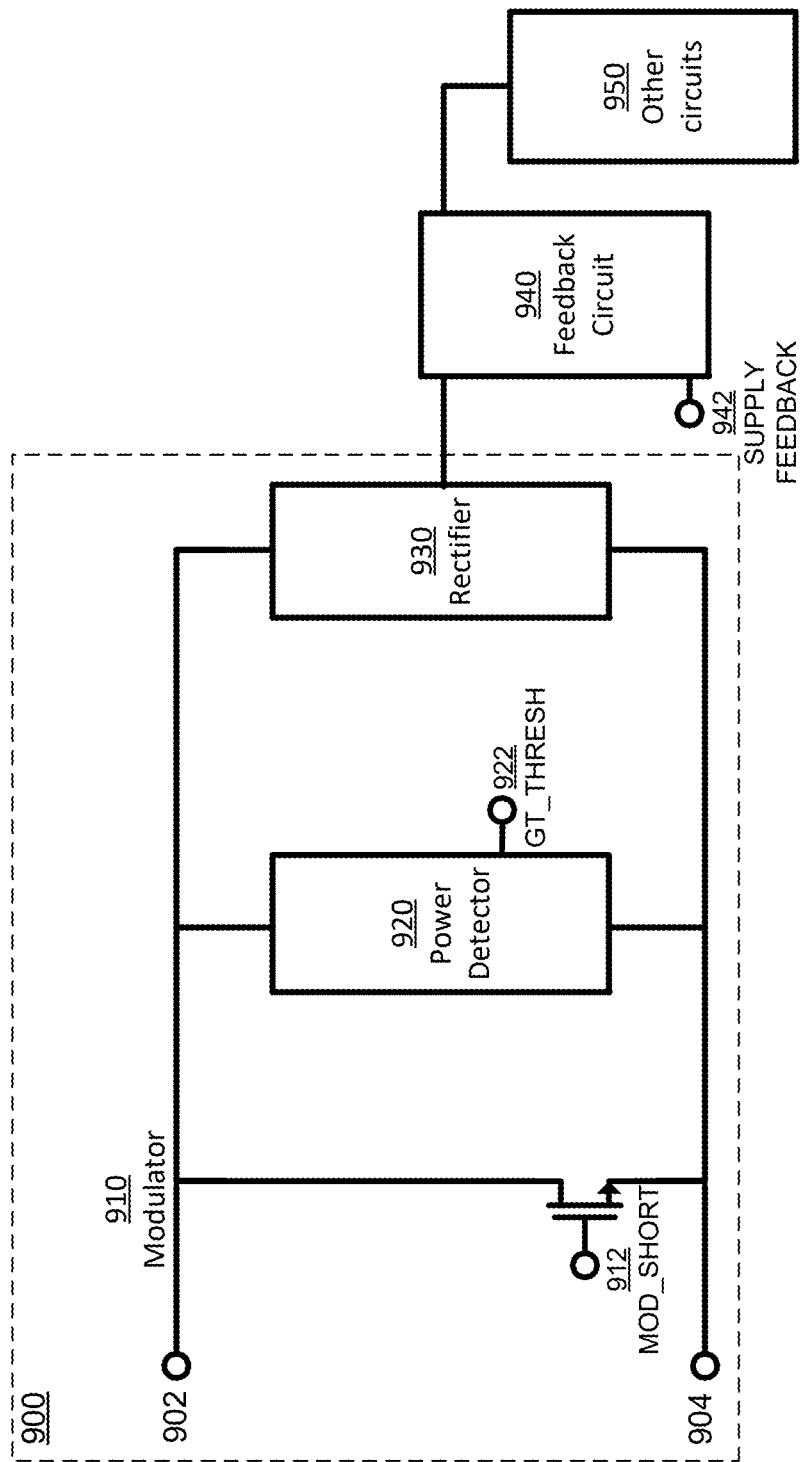
FIG. 9 depicts a simplified example diagram of an RFID integrated circuit front-end, according to embodiments.

FIG. 9 depicts a simplified example diagram of an RFID integrated circuit front-end 900 according to embodiments. The front-end 900 is similar to portions of the circuit 424 in FIG. 4. For example, the front-end 900 includes a first terminal 902 and a second terminal 904, which may correspond to the IC contacts 432 and 433, respectively, of the circuit 424, and may be coupled to an antenna. The front-end 900 further includes a modulator 910 (depicted in a simplified manner) similar to the modulator 446, a power detector 920 that may be part of the rectifier and PMU 441 and/or the demodulator 442, and a rectifier 930 similar to the rectifier and PMU 441. The rectifier 930 may additionally be coupled to a feedback circuit 940 and other circuits 950.

The modulator 910 is configured to modulate a backscattered RF wave, as described above. In FIG. 9, modulator 910 operates based on signals from an input MOD_SHORT 912. For example, other circuits in the RFID IC (for example, the other circuits 950) may provide data symbol signals to modulator 910 via input MOD_SHORT 912. Modulator 910 then adjusts its impedance based on the received signals. The modulator's impedance adjustments also modulate the input impedance of the front-end 900 (that is, the impedance of front-end 900 viewed from the terminals 902 and 904) and the reflectance of an antenna coupled to the terminals 902 and 904, thereby backscatter-modulating RF waves incident on the antenna. Modulator 910 may be implemented using a single transistor switch, as depicted in FIG. 9, or may include other circuitry that contribute to and/or allow adjustment of the input impedance of the front-end 900, as described below.

The power detector 920, which may be part of another IC component (such as the rectifier and PMU 441 and/or the demodulator 442), may be configured to detect a power associated with an RF wave incident on a coupled antenna for power harvesting and/or demodulation, and, in some embodiments, may implement a peak detector configured to determine the maximum or minimum value of an oscillating signal and/or an envelope detector configured to determine the envelope or extremes of an oscillating signal. Power detector 920 may implement an output GT_THRESH 922, which may be used to, for example, determine an operating point for the rectifier 930 as described in commonly-assigned U.S. Pat. No. 10,572,789 issued on Feb. 25, 2020 and hereby incorporated by reference in its entirety, or to determine whether the IC should adjust its impedance for backscatter.

The rectifier 930, which may be similar to or implemented within rectifier and PMU 441, is configured to harvest energy from an RF wave incident on a coupled antenna to power components of the RFID IC. The output of rectifier 930 may be coupled to the feedback circuit 940 and the other circuits 950. For example, the rectifier 930 may deliver voltage and current rectified from incident RF signals to the feedback circuit 940 and the other circuits 950, for power, sensing, and/or any other suitable purpose. In some embodiments, the feedback circuit 940 may output a supply feedback signal 942 based on the voltage, current, and/or power delivered by the rectifier 930.

As mentioned above, modulator 910 modulates a backscattered RF wave by adjusting the modulator impedance. For example, modulator 910 may switch between an electrical short-circuit state and an electrical open-circuit state according to a pattern associated with the data values to be encoded, via the action of the input MOD_SHORT 912. As defined in this description the electrical short-circuit and open-circuit states are not ideal short and open circuits. When the modulator 910 is in the electrical short-circuit state, the input impedance of the front-end 900 is dominated by the low impedance of modulator 910 and therefore is low, similar to an electrical short-circuit and corresponding to the first impedance value (or the second impedance value) as described above. On the other hand, when the modulator 910 is in the electrical open-circuit state and therefore has a very high resistance, the input impedance of the front-end 900 may be dominated by the combination of impedances of the other elements in the front-end 900 (e.g., power detector 920 and rectifier 930). This combination of impedances corresponds to the second impedance value (or the first impedance value if the low electrical impedance corresponds to the second impedance value).

To adjust backscatter strength, an RFID tag or IC can adjust its modulator's short-circuit state impedance and/or its front-end impedance during/for the modulator's open-circuit state. As described above, a modulator such as modulator 910 modulates a backscattered RF wave by switching between a short-circuit state, in which its impedance dominates the front-end impedance, and an open-circuit state, in which the impedances of other components dominate the front-end impedance. Changing the modulator impedance value for the short-circuit state therefore affects one of the front-end impedances that define the delta-gamma parameter, thereby changing the delta-gamma parameter and the backscatter strength.

A modulator's short-circuit state impedance may be adjusted in any suitable way, and the nature of the impedance adjustments may be resistive, reactive (e.g., capacitive and/or inductive), or a combination. For example, the modulator may have one or more variable impedances coupled in series and configured to affect the modulator's impedance during the short-circuit state. The variable impedances may be of any suitable type, such as variable or switched resistor(s), capacitor(s), and/or inductor(s), and may be coupled to or decoupled from the modulator based on signals from a control circuit, such as feedback circuit 940 and/or other circuits 950. As another example, the modulator may include multiple, parallel transistor switches that bridge antenna terminals, where each transistor switch is similar to the single transistor switch in modulator 910. When the modulator is in the short-circuit state, one or more of the parallel transistor switches are turned on. The modulator short-circuit state impedance then varies as the number of "on" transistor switches, with more "on" transistor switches corresponding to a lower short-circuit state impedance, and vice-versa. Accordingly, the modulator's short-circuit state impedance can be adjusted by controlling the number of transistor switches that are turned on. In some embodiments, a modulator may implement multiple modulators, each with a different short-circuit state impedance, and the modulator short-circuit state impedance may be adjusted by selecting the modulator(s) used for backscatter modulation.

The RFID IC can also (or instead) adjust its front-end impedance for the modulator's open-circuit state, when the IC front-end impedance is dominated by the impedances of other components in the front-end. This may involve adjusting the impedances of other components in the front-end, such as power detector 920 and/or rectifier 930. In some embodiments, such adjustments may be performed as described in U.S. Pat. No. 10,572,789, referenced above.

Similar to how the reply collision recovery rate in a tag population is related to the average amplitude difference between collided replies, the reply collision recovery rate may also be related to the average phase difference between collided replies. In some embodiments, modulator short-circuit impedance and/or front-end impedance may be adjusted to introduce a phase shift into the backscattered signal, to increase the average phase difference between collided replies and assist a reader in performing phase-based recovery of the backscattered signal. This may be done by adjusting a reactive impedance associated with the modulator and/or the IC front-end. The modulator and/or the IC front-end may include one or more capacitances, inductances, or other reactive impedance elements. The impedance values of these reactive impedance elements may be adjustable mechanically or electronically. For example, the modulator may include multiple capacitive or inductive elements that can be individually coupled to or decoupled from antenna terminals, thereby providing a variable reactive impedance and introducing a phase shift to any backscattered signals. The magnitude of an introduced phase shift may be positive or negative. For example, a capacitive element may be coupled to antenna terminals to provide a phase shift in one direction, while an inductive element may be coupled to antenna terminals to provide a phase shift in the other direction. The magnitude of the phase shift is determined by the number or size of the coupled elements.

Upon receiving collided replies with different phase shifts, a suitably-configured RFID reader may be able to use the differing phase shifts to discriminate between and recover the collided replies. For example, the reader may identify a phase shift associated with one collided reply and use the identified phase shift to recover the associated collided reply. In some embodiments, an RFID reader may recover collided replies using blind source separation or any other suitable technique, as described in commonly-assigned U.S. Pat. No. 10,037,444, referenced above.

In some embodiments, an RFID IC may adjust both the resistive (real) portion and the reactive (imaginary) portion of its impedance. This would affect both the strength (amplitude) and phase of a backscattered signal, and may facilitate the recovery of collided replies by a suitably-configured RFID reader. In this disclosure, "amplitude parameter" refers to any parameter that affects the strength or amplitude of a backscattered signal (e.g., the delta-gamma parameter), "phase parameter" refers to any parameter that affects the phase of a backscattered signal, and "backscatter parameters" may refer to amplitude parameter(s) and/or phase parameter(s).

In some embodiments, an RFID reader system causes RFID tag ICs to adjust their backscatter parameters. For example, the reader system may transmit a command to one or more tags explicitly instructing the tags to adjust their backscatter parameters. The command may include a backscatter parameter change instruction and may also indicate the extent to which the backscatter parameter should be adjusted. The reader system may cause RFID tag ICs to adjust their backscatter parameters periodically, for example upon expiration of a timer or counter at the reader, or aperiodically, for example based on some environmental parameter. The reader system may also cause RFID tag ICs to reset their backscatter parameters to a default value. The reader system may cause all visible RFID tag ICs to adjust their backscatter parameters, or only a subset of visible RFID tag ICs to do so.

The reader system may determine whether to cause RFID tag ICs to adjust their backscatter parameters based on one or more suitable criteria. In one embodiment, the reader system may cause RFID tag ICs to adjust their backscatter parameters if the reader system determines that a reply collision recovery rate of a tag population is unsatisfactory, in order to improve the reply collision recovery rate and thereby improve collided reply recovery in general. A reply collision recovery rate is representative of how successful the reader system is at recovering one or more replies from a collision, and may be determined in any suitable way. For example, a reply collision recovery rate may be determined by dividing the number of recoverable collisions (that is, the number of collisions from which at least one reply was recovered) over a time duration by the number of total collisions over that time duration. A reader system may determine that a reply collision recovery rate is unsatisfactory if the rate reaches or falls below a certain threshold, and may take action to improve collided reply recovery such that the reply collision recovery rate satisfies or exceeds the certain threshold. In other embodiments, a reader system may use other rates or measures to determine whether RFID tag ICs should adjust their backscatter parameters. For example, the reader system may use an unrecoverable collision rate (e.g., the ratio of collisions from which no replies were recovered to total collisions, both over the same time duration), a count of unrecoverable collisions (e.g., collisions from which no replies were recovered) over a time duration, a probability of reply collision recovery, or any other suitable measure, to determine whether RFID tag ICs should adjust their backscatter parameters.

In another embodiment, a reader system may cause RFID tag ICs to adjust their backscatter parameters if it determines that many RFID tag ICs are close together. When many RFID tag ICs are close together, the recovery rate of reply collisions may be relatively low or unsatisfactory, and therefore the reader system may act to improve the reply collision recovery rate. In this situation, the reader system may not actually measure the reply collision recovery rate before causing tag ICs to adjust their backscatter parameters. Instead, the reader system identifies a tag IC, determines that it is (or likely is) part of a group of closely-spaced tag ICs and therefore an unsatisfactory reply collision recovery rate is likely, and in response to the determination causes tag ICs to adjust their backscatter parameters. The reader system may determine that many RFID tag ICs are close together by direct detection of the relevant tag ICs (e.g., via received signal strength indication or RSSI, angle-of-arrival, or some other parameter associated with replies from the tag ICs), or by determining that a group of closely-spaced tag ICs is present or approaching. For example, a reader system may determine that a container or pallet containing a group of tags is approaching or has arrived, either by receiving a message from another entity or by detecting an RFID tag IC associated with the container or pallet. Of course, a reader system may be configured to cause RFID tag ICs to adjust their backscatter parameters for any other suitable reason, even if not related to reply collision recovery.

In some embodiments, the reader system may send a command that causes RFID tag ICs to begin adjusting their backscatter parameters, where the adjustment extent and timing are provided in the command or determined by the individual tag ICs. For example, the reader system may send a command that instructs RFID tag ICs to adjust their backscatter parameters in a certain, reader-specified or tag-IC-determined way if an environmental parameter (e.g., detected power) meets, exceeds, or falls below a certain threshold. Similarly, the reader system may subsequently send a command causing RFID tag ICs to cease adjusting their backscatter parameters.

An RFID tag IC may itself decide to adjust its backscatter parameter(s) based on any suitable criterion. For example, the IC may receive a reader command that, while not explicitly including an instruction to adjust backscatter parameters, the IC interprets as instructing a backscatter parameter change. In some embodiments, the IC may adjust its backscatter parameter(s) based on a detected power (e.g., via supply feedback signal 942 or output 922), some other detected environmental parameter, upon a timer or counter expiring or reaching a threshold, upon entering or exiting a certain operating state, upon succeeding or failing to complete an inventory round, upon determining that it is to backscatter a reply, upon actually backscattering a reply, or based on any other suitable criterion.

RFID tag ICs may be configured to adjust their backscatter parameter(s) in a random or pseudorandom manner. This may allow individual tag ICs in a population to vary their respective backscatter parameter(s) differently, increasing the variability or standard deviation of the distribution of backscatter parameter(s) in the population. In some embodiments, an RFID tag IC may adjust its backscatter parameter(s) based on a pseudorandom number output. For example, the IC may include or implement a pseudorandom number generator for operation according to a protocol. Whenever the IC decides to change backscatter parameter(s), it may adjust its backscatter parameter(s) based on one or more bits from a generated pseudorandom number. The IC may generate the pseudorandom number specifically for adjusting its backscatter parameter(s), or the IC may use a previously-generated pseudorandom number to adjust its backscatter parameter(s). In some embodiments, the IC may change backscatter parameter(s) whenever a new pseudorandom number is generated, for example during communication with a reader, and base its backscatter parameter change on the newly-generated pseudorandom number.

The impedance adjustments for the modulator's short-circuit state and the RFID IC's front-end may be in discrete steps or substantially continuous. Accordingly, there may be multiple adjusted impedance options for the modulator's short-circuit state and the IC's front-end. For example, upon determining that the modulator's short-circuit state impedance should be adjusted, the RFID IC may choose or select from two or more different impedance values. The RFID IC may select the impedance value (for the modulator short-circuit state and/or its front-end) based on any suitable criterion. In one embodiment, a reader system sends a command to the RFID IC that specifies a certain impedance value to switch to. In other embodiments, a reader system sends a command that specifies a certain desired backscatter parameter, parameter range, or parameter adjustment, and the RFID IC selects appropriate impedance value(s) based on the command.

In some embodiments, the RFID IC selects appropriate backscatter parameter(s) or impedance value(s) based on the self-decision criteria described above. For example, the RFID IC may select appropriate impedance value(s) based on a detected power, detected environmental parameter, an operating state, an event, one or more bits from a random or pseudorandom number, or any other suitable criterion. In some embodiments, the RFID IC selects appropriate impedance value(s) to ensure that any backscattered signal can reach an inventorying reader. For example, the RFID IC, upon receiving a signal from a reader, can derive a parameter representing the minimum power a backscattered signal should have for successful reader reception and selects its impedance value(s) based on the derived parameter. The RFID IC may derive the parameter based on a power detector (e.g., power detector 920 or output 922). In some embodiments, the RFID IC may determine that certain impedance adjustments (for example, reducing its delta-gamma parameter) would result in a reader being unable to successfully receive a backscattered signal. In these situations, the RFID IC may choose to not perform those certain impedance adjustments so that a reader can successfully receive any replies the RFID IC backscatters.

In some embodiments, an RFID reader system may cause RFID ICs to, or the RFID ICs may be configured to, adjust backscatter parameters to improve collided reply recovery by default. For example, the RFID reader system may be configured to, before or during inventorying, always send a command to RFID ICs to adjust backscatter parameters. As another example, RFID ICs may always be able to adjust their backscatter parameters, as described above. In these situations, there may nevertheless be certain circumstances under which RFID ICs do not adjust backscatter parameters. For example, the RFID reader system may command RFID ICs to adjust backscatter parameters unless such adjustment would result in the reader system being unable to successfully receive a backscattered signal (as mentioned above). Similarly, even if an RFID IC is configured to always be able to adjust their backscatter parameters, it may choose not to if such adjustment would result in the reader system being unable to successfully receive a backscattered signal (as mentioned above).

If the RFID IC adjusts its impedance value(s) for backscattering, in some embodiments the RFID IC sends an indication to the reader of the impedance adjustment. For example, the RFID IC may indicate to the reader that it has adjusted its impedance value(s), the extent to which it has adjusted its impedance value(s), and/or the actual, adjusted impedance values. The RFID IC may provide the indication in a reply and/or by setting one or more flags or memory locations to certain values. The reader or reader system may then use the indication for further determinations, for example of RFID IC proximity or movement. For example, if a reader system uses RSSI to estimate RFID IC proximity, movement, or other information, the reader system may use adjustment indications received from RFID ICs to adjust its estimation.

An RFID IC may adjust its impedance value(s) to attenuate or amplify the backscattered signal. For example, the RFID IC front end may include one or more components or devices configured to provide a negative resistance or impedance, where current through the component or device decreases as voltage across the component increases. Negative-resistance components may provide signal gain, thereby allowing the RFID IC to amplify the backscattered signal. Negative-resistance components include tunnel diodes, resonant tunneling diodes, and other semiconductor devices based on tunneling. However, any suitable negative-resistance component or device, passive or active, may be used to allow the RFID IC to amplify a backscattered signal.

As mentioned previously, embodiments are directed to causing RFID tag ICs to vary their backscatter parameters. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. Information represented by the states of these quantities may be referred-to as bits, data bits, samples, values, symbols, characters, terms, numbers, or the like. However, these and similar terms are associated with and merely convenient labels applied to the appropriate physical quantities, individually or in groups.

Embodiments furthermore include storage media. Such media, individually or in combination with others, have stored thereon instructions, data, keys, signatures, and other data of a program made according to the embodiments. A storage medium according to embodiments is a computer-readable medium, such as a memory, and can be read by a processor of the type mentioned above. If a memory, it can be implemented in any of the ways and using any of the technologies described above.

Even though it is said that a program may be stored in a computer-readable medium, it does not need to be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

According to one example, a Radio Frequency Identification (RFID) reader system configured to improve collided reply recovery in an RFID tag population is provided. The system includes an RFID reader configured to communicate with the tag population and a controller coupled to the RFID reader. The controller is configured to determine that a reply collision recovery rate of the tag population is unsatisfactory, in response determine that at least a subset of tags in the tag population are to adjust their respective amplitude parameters during backscatter to improve the reply collision recovery rate, and cause the RFID reader to transmit a command instructing at least the subset of tags to adjust their respective amplitude parameters.

According to another example, a Radio Frequency Identification (RFID) reader system configured to improve collided reply recovery in an RFID tag population is provided. The system includes an RFID reader configured to communicate with the tag population and a controller coupled to the RFID reader. The controller is configured to determine that a reply collision recovery rate of the tag population is unsatisfactory, in response determine that at least a subset of tags in the tag population are to adjust their respective phase parameters during backscatter to improve the reply collision recovery rate, and cause the RFID reader to transmit a command instructing at least the subset of tags to adjust their respective phase parameters.

According to a further example, a Radio Frequency Identification (RFID) component configured to improve collided reply recovery in an RFID tag population is provided. The component includes an interface configured to couple to an RFID reader module and a controller. The controller is configured to determine that a reply collision recovery rate of the tag population is unsatisfactory, in response determine that at least a subset of tags in the tag population are to adjust their respective backscatter parameters to adjust a reply power distribution of the tag population, and instruct the RFID reader module via the interface to transmit a command causing each tag in at least the subset of tags to adjust a respective backscatter parameter.

According to some embodiments, the reply collision recovery rate is related to an average amplitude difference and/or an average phase difference between collided replies, and the controller is configured to determine the subset of tags in order to increase the average amplitude and/or phase difference between collided replies. In some embodiments the reply collision may be related to the reply power distribution and the controller may be configured to determine the subset of tags in order to increase the reply power distribution. The controller may be configured to determine that the reply collision recovery rate is unsatisfactory if the reply collision recovery rate is below a threshold and/or based on an identity of at least one tag in the tag population. A tag's amplitude parameter may be based on a real portion of a tag impedance, and a tag's phase parameter may be based on an imaginary portion of a tag impedance. The command may enable each tag in the subset to begin adjusting a respective amplitude and/or phase parameter. Each tag in the subset may individually determine a magnitude and/or a timing of a respective amplitude, phase, and/or backscatter parameter adjustment based on a schedule, a timer, a random number, a pseudorandom number, a detected power, a tag operating state, and/or a completion of an inventory round.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) reader system configured to improve collided reply recovery in an RFID tag population, the system comprising:
    an RFID reader configured to communicate with the tag population; and
    a controller coupled to the RFID reader and configured to:
        determine that multiple tags in the tag population are to adjust their respective delta-gamma parameters during backscatter to improve a reply collision recovery rate of the tag population; and
        cause the RFID reader to transmit a command instructing a plurality of tags in the tag population to each adjust their respective delta-gamma parameters using one or more bits of a respective tag-generated pseudorandom number.

2. The system of claim 1, wherein:
    the reply collision recovery rate is related to an average amplitude difference between collided replies; and
    the controller is configured to determine the plurality of tags in order to increase the average amplitude difference between collided replies.

3. The system of claim 1, wherein the controller is configured to determine that the multiple tags are to adjust their respective delta-gamma parameters during backscatter if the reply collision recovery rate is below a threshold.

4. The system of claim 1, wherein the controller is configured to determine that the multiple tags are to adjust their respective delta-gamma parameters during backscatter based on an identity of at least one tag in the tag population.

5. The system of claim 1, wherein a tag's delta-gamma parameter is based on a real portion of a tag impedance.

6. The system of claim 1, wherein the command enables each tag in the plurality of tags to begin adjusting a respective delta-gamma parameter.

7. The system of claim 1, wherein each tag in the plurality of tags individually determines at least one of a magnitude and a timing of a respective delta-gamma parameter adjustment based on at least one of a schedule, a timer, a random number, a pseudorandom number, a detected power, a tag operating state, and a completion of an inventory round.

8. A Radio Frequency Identification (RFID) reader system configured to improve collided reply recovery in an RFID tag population, the system comprising:
    an RFID reader configured to communicate with the tag population; and
    a controller coupled to the RFID reader and configured to:
        determine that multiple tags in the tag population are to use different phase parameters while modulating backscatter signals to improve a reply collision recovery rate of the tag population; and
        cause the RFID reader to transmit a command instructing a plurality of tags in the tag population to each adjust their respective phase parameters using one or more bits of a respective tag-generated pseudorandom number.

9. The system of claim 8, wherein:
    the reply collision recovery rate is related to an average phase difference between collided replies; and
    the controller is configured to determine the plurality of tags in order to increase the average phase difference between collided replies.

10. The system of claim 8, wherein the controller is configured to determine that the multiple tags are to use different phase parameters if the reply collision recovery rate is below a threshold.

11. The system of claim 8, wherein the controller is configured to determine that the multiple tags are to use different phase parameters based on an identity of at least one tag in the tag population.

12. The system of claim 8, wherein a tag's phase parameter is based on an imaginary portion of a tag impedance.

13. The system of claim 8, wherein the command enables each tag in the plurality of tags to begin adjusting a respective phase parameter.

14. The system of claim 8, wherein each tag in the plurality of tags individually determines at least one of a magnitude and a timing of a respective phase parameter adjustment based on at least one of a schedule, a timer, a random number, a detected power, a tag operating state, and a completion of an inventory round.

15. A Radio Frequency Identification (RFID) component configured to improve collided reply recovery in an RFID tag population, the component comprising:
- an interface configured to couple to an RFID reader module; and
- a controller configured to:
  - determine that a reply power distribution of the tag population is to be increased to improve a reply collision recovery rate of the tag population; and
  - instruct the RFID reader module, via the interface, to transmit a command causing each tag in a plurality of tags in the tag population to each adjust a respective backscatter parameter using one or more bits of a respective tag-generated pseudorandom number.

16. The component of claim 15, wherein:
- the reply collision recovery rate is related to the reply power distribution; and
- the controller is configured to determine the plurality of tags in order to increase the reply power distribution.

17. The component of claim 15, wherein the controller is configured to determine that the reply power distribution is to be increased if the reply collision recovery rate is below a threshold.

18. The component of claim 15, wherein the controller is configured to determine that the reply power distribution is to be increased based on an identity of at least one tag in the tag population.

19. The component of claim 15, wherein a tag's backscatter parameter includes at least one of:
- an amplitude parameter based on a real portion of a tag impedance; and
- a phase parameter based on an imaginary portion of the tag impedance.

20. The component of claim 15, wherein each tag in the plurality of tags individually determines at least one of a magnitude and a timing of a respective backscatter parameter adjustment based on at least one of a schedule, a timer, a random number, a detected power, a tag operating state, and a completion of an inventory round.

* * * * *